(12) United States Patent
Sobue et al.

(10) Patent No.: US 9,531,659 B2
(45) Date of Patent: Dec. 27, 2016

(54) APPARATUS AND METHOD FOR MANAGING MESSAGES

(75) Inventors: Tatsuya Sobue, Kanagawa (JP); Norimasa Hayashida, Kanagawa (JP); Akihiro Kosugi, Kanagawa (JP); Atsushi Sato, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 12/639,314

(22) Filed: Dec. 16, 2009

(65) Prior Publication Data

US 2011/0145236 A1 Jun. 16, 2011
US 2016/0330043 A9 Nov. 10, 2016

(30) Foreign Application Priority Data

Jan. 27, 2009 (JP) ................ 2009-015752

(51) Int. Cl.
  *G06F 7/00* (2006.01)
  *G06F 17/30* (2006.01)
  *H04L 12/58* (2006.01)

(52) U.S. Cl.
  CPC ............ *H04L 51/22* (2013.01); *H04L 51/16* (2013.01); *G06F 17/30* (2013.01)

(58) Field of Classification Search
  None
  See application file for complete search history.

(56) References Cited

U.S. PATENT DOCUMENTS

| | | | |
|---|---|---|---|
| 6,515,681 B1 * | 2/2003 | Knight | 707/999.003 |
| 2004/0267700 A1 * | 12/2004 | Dumais et al. | 707/2 |
| 2005/0283468 A1 * | 12/2005 | Kamvar et al. | 707/3 |
| 2007/0005701 A1 * | 1/2007 | Barsness et al. | 709/205 |
| 2007/0106729 A1 * | 5/2007 | Adams et al. | 709/206 |
| 2007/0168448 A1 * | 7/2007 | Garbow et al. | 709/207 |
| 2008/0040316 A1 * | 2/2008 | Lawrence | 707/3 |
| 2010/0003967 A1 * | 1/2010 | Datta et al. | 455/412.1 |

FOREIGN PATENT DOCUMENTS

| | | | |
|---|---|---|---|
| JP | 7084839 | A | 3/1995 |
| JP | 2000078298 | A | 3/2000 |
| JP | 2000330913 | A | 11/2000 |
| JP | 2001117849 | A | 4/2001 |
| JP | 2002288102 | A | 10/2002 |
| JP | 2003058464 | A | 2/2003 |
| JP | 2004213153 | A | 7/2004 |
| JP | 2006302146 | A | 11/2006 |

* cited by examiner

*Primary Examiner* — Jau-Shya Meng
(74) *Attorney, Agent, or Firm* — Brian J. Colandreo, Esq.; Jeffrey T. Placker, Esq.; Holland & Knight LLP

(57) ABSTRACT

In a client, an input receiver receives utterance data inputted through the client and utterance data inputted through a different client and received by a receiver, and then stores the utterance data in a past log storage as a past log. When the input receiver receives new utterance data, a reference information generator determines preceding utterance data referred to by the new utterance data, from the past log, generates reference information indicating a reference relationship, and then stores the reference information in a reference information storage. Then, a transmitter transmits the new utterance data and the reference information to the different client, and a display controller displays the utterance data stored as the past log, the new utterance data, and an indicator based on the reference information.

11 Claims, 14 Drawing Sheets

(a)

| UTTERANCE NO. | UTTERANCE DATA |
|---|---|
| 5 | OH, BY THE WAY, HAVE YOU FOUND A PLACE FOR THE MEETING NEXT WEEK? |
| 6 | WE SHOULD ALSO PRINT THE PRESENTATION CHART. |
| 7 | NO PROBLEM. IT IS READY. |
| 8 | WHAT ABOUT THE POSTER TO PUT UP ON THE WALL? |

(b)

| UTTERANCE NO. | UTTERANCE DATA |
|---|---|
| 5 | OH, BY THE WAY, HAVE YOU FOUND A PLACE FOR THE MEETING NEXT WEEK? |
| 6 | WE SHOULD ALSO PRINT THE PRESENTATION CHART. |

FIG. 8

| REFERENCE INFORMATION | | REFERENT INFORMATION | |
|---|---|---|---|
| UTTERANCE NUMBER | WORD LOCATION | UTTERANCE NUMBER | WORD LOCATION |
| 7 | | 5 | |
| 9 | 1-2 | 6 | 10-11 |
| ... | ... | ... | ... |

APPARATUS AND METHOD FOR MANAGING MESSAGES

BACKGROUND OF THE INVENTION

The present invention relates to an apparatus and a method for managing messages. In particular, the present invention relates to an apparatus and a method for managing messages inputted by multiple users or through multiple apparatuses.

Nowadays, many people use chat as a means of real-time communication with others in various situations. In a chat, a conversation is established in such a way that two or more participants individually input utterances and share a log of the utterances displayed chronologically. In such a chat, since utterances are inputted asynchronously, the utterances are not necessarily arranged in semantic units in a chronological log. For this reason, it is difficult to follow the flow of conversation in some cases, causing difficulty in understanding the conversation and misunderstanding. Such situations are particularly likely to occur when three or more participants are involved or in a fast-paced conversation.

In light of these situations, there have been proposed techniques for displaying utterances in a chat so that relationships between the utterances would easily be understood (see, for example, Japanese Patent Application Publication No. 2002-288102 (Patent Literature 1), Japanese Patent Application Publication No. 2001-117849 (Patent Literature 2), and Japanese Patent Application Publication No. 2000-330913 (Patent Literature 3)).

In Patent Literature 1, utterance data are displayed as follows. Specifically, when a user makes an utterance in response to an utterance by a speaker A, utterance data is transmitted with an identifier added thereto, the identifier specifying the speaker A or data on the utterance by the speaker A. When the transmitted utterance data is received, the identifier added to the received utterance data is identified, and thereby the utterance data is displayed in a display manner matched with that used for the past utterance corresponding to the received utterance data.

In Patent Literature 2, for example, a conversation on a topic related to a car is held in an upper left area on a screen, while a conversation on a topic related to a personal computer is held in a lower right area on the screen. In this way, mixing-up of the two topics is avoided. This enables a chat in which a group of utterances for each topic or the like can be visually identified on the screen.

In Patent Literature 3, when a time gap between two utterances is 10 minutes or longer, a ruled line is displayed between the utterances. This makes it easier to recognize related utterances as a single utterance group.

SUMMARY OF INVENTION

As described above, attempts have heretofore been made to display utterances so that relationships of the utterances would be identified easily.

However, in the technique of Patent Literature 1, the identifier that specifies the past utterance corresponding to the utterance data is added by the user and not by computer processing.

Moreover, in the technique of Patent Literature 2, what is only described is a result of enabling a chat in which users can visually identify each topic group, and how each topic group is identified by computer processing is not clear.

Furthermore, in the technique of Patent Literature 3, each utterance group of related utterances is extracted on the basis of time gaps between utterances. However, for example, when an unrelated utterance cuts into related utterances, an extracted utterance group may not be a group of related utterances, and thus accuracy in identifying each utterance group decreases.

Meanwhile, in recent chat, expressions such as "Everything is going well>preparation" and "I understand what you mean>Mr. A" are sometimes used to refer to past utterances. This reduces ambiguity to some extent. However, it takes some time and work to input such an expression, and such an expression is often insufficient.

Such problems occur not only in chat but also in a bulletin board system and the like in which multiple users write utterances asynchronously.

An object of the present invention is to makes it possible to clearly display a correct reference relationship between a new utterance and a particular utterance made in the past, without requiring a user to spend time and effort more than necessary when the user makes the new utterance.

To achieve the foregoing object, an aspect of the present invention provides an apparatus that manages a group of a plurality of messages inputted by a plurality of users, the apparatus including: an acquiring unit that acquires a message; a storage unit that stores a plurality of messages acquired in the past by the acquiring unit; and a generating unit that generates reference information based on a result of analysis on a first message that is newly acquired by the acquiring unit, the reference information indicating a reference relationship between the first message and a second message that is one of the plurality of messages stored in the storage unit and is referred to by the first message.

In the apparatus, the generating unit may determine the second message by searching, on the basis of the result of the analysis on the first message, the plurality of messages stored in the storage unit. In this case, the generating unit may determine, as the second message, a message including a word related to a word included in the first message, among the plurality of messages stored in the storage unit. The generating unit may also display at least one message obtained by searching the plurality of messages stored in the storage unit on the basis of the result of the analysis on the first message, and then determine, as the second message, one message chosen by a user from among the at least one message. Moreover, the generating unit may generate the reference information including identification information on the second message obtained on the basis of the result of the analysis on the first message.

An aspect of the present invention also provides an apparatus that displays a message inputted through the apparatus and a message inputted through a different apparatus, the apparatus including: an acquiring unit that acquires a message inputted through the apparatus; a receiving unit that receives, from the different apparatus, a message inputted through the different apparatus; a storage unit that stores a plurality of messages including a message acquired in the past by the acquiring unit and a message received in the past by the receiving unit; a determining unit that displays at least one message including a word related to a word included in a first message newly acquired by the acquiring unit, among the plurality of messages stored in the storage unit, and then determines, among the plurality of messages, a second message referred to by the first message, by causing a user to choose one message from among the at least one message; a generating unit that generates reference information indicating a reference relationship between the first message acquired by the acquiring unit and the second message determined by the determining unit; and a display unit that displays the first message acquired by the acquiring unit, the plurality of messages stored in the storage unit, and an indicator based on the reference information generated by the generating unit.

Furthermore, an aspect of the present invention also provides a method of managing a group of a plurality messages inputted by a plurality of users, the method including the steps of: recording a plurality of messages inputted in the past, in a recording medium; acquiring a first message that is newly inputted; and generating reference information based on a result of analysis on the first message, the reference information indicating a reference relationship between the first message and a second message that is one of the plurality of messages recorded in the recording medium and is referred to by the first message.

Furthermore, an aspect of the present invention also provides a program that causes a computer to function as an apparatus that manages a message inputted through the apparatus and a message inputted through a different apparatus. The program causes the computer to function as: an acquiring unit that acquires a message inputted through the apparatus; a receiving unit that receives, from the different apparatus, a message inputted through the different apparatus; a recording unit that records, in a recording medium, a plurality of messages including a message acquired in the past by the acquiring unit and a message received in the past by the receiving unit; and a generating unit that generates reference information based on a result of analysis on a first message newly acquired by the acquiring unit, the reference information indicating a reference relationship between the first message and a second message that is one of the plurality of messages recorded in the recording medium and is referred to by the first message.

BRIEF DESCRIPTION OF DRAWINGS

For a more complete understanding of the present invention and the advantage thereof, reference is now made to the following description taken in conjunction with the accompanying drawings.

FIGS. 8A and 8B are tables each showing an example of a past log recorded by the client, according to the embodiment of the present invention.

DESCRIPTION OF EMBODIMENTS

An embodiment of the present invention will be described below in detail with reference to the accompanying drawings.

First, a computer system to which this embodiment is applied will be described.

Figure 1:
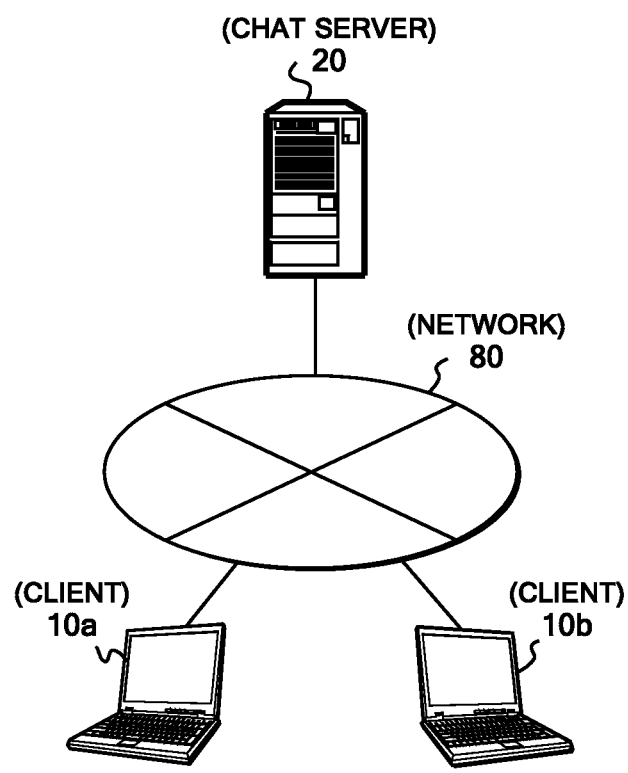
FIG. 1 is a view showing an entire configuration of a computer system, according to an embodiment of the present invention.

FIG. 1 is a view showing an example of an entire configuration of such a computer system.

As shown in FIG. 1, in the computer system, a client 10*a*, a client 10*b* and a chat server 20 are connected via a network 80.

The clients 10*a* and 10*b* are terminal apparatuses, such as PCs, used by chat participants (simply called "participants," below). More specifically, the clients 10*a* and 10*b* are each a terminal apparatus used by a participant to exchange, with other participants, data on the contents of utterances (called "utterance data," below). Here, each chat participant is an example of a user, and utterance data is an example of a message. Although only two clients are shown in FIG. 1, three or more clients may be included. Moreover, in the following, the clients 10*a* and 10*b* may simply be called "clients 10" when they do not need to be distinguished.

The chat server 20 is a server computer that manages utterance data exchange in a chat through the network 80. For example, in response to requests for participation in the same chat from the client 10*a* of a participant A and the client 10*b* of a participant B through the network 80, the chat server 20 manages identification information on the chat, identification information on each of the participants A and B, identification information on each of the clients 10*a* and 10*b*, and the like. When an utterance is inputted by the participant A or the participant B, the chat server 20 performs such a control that utterance data on the utterance would be transmitted to the client 10 of the other participant.

The network 80 is a communication means used for utterance data exchange. Examples of the network 80 are the Internet and a local area network (LAN).

In the computer system having the above-described configuration, when multiple participants participate in a chat by respectively using the clients 10, the participants input utterances asynchronously, the contents of the utterances are displayed on screens of the respective clients 10 chronologically. In such a case, it is sometimes difficult to see to which past utterance a new utterance is made as a reply.

In view of such a situation, this embodiment makes it possible for a participant making a new utterance, to clearly show a past utterance to which the new utterance is made as a reply. Specifically, in normal operation for inputting an utterance, information on a reference relationship between the new utterance and the past utterance (called "reference information," below) is generated and embedded in the new utterance, by any one of the following methods.

(1) Indirect Input Using Reference Input Support

In the case of using this input method, firstly, a participant inputs an utterance in a normal way. Upon the input, when a word included in the utterance is also included in the log of past utterances, the part of the word is marked so as to show that a choice can be made for the word.

Thereby, when the participant clicks the marked part, a list of reference candidates is displayed. Then, the participant chooses a referent among the referent candidates, and thereby reference information on the referent is embedded in the inputted utterance.

This input method will be described below concretely.

Figure 2:
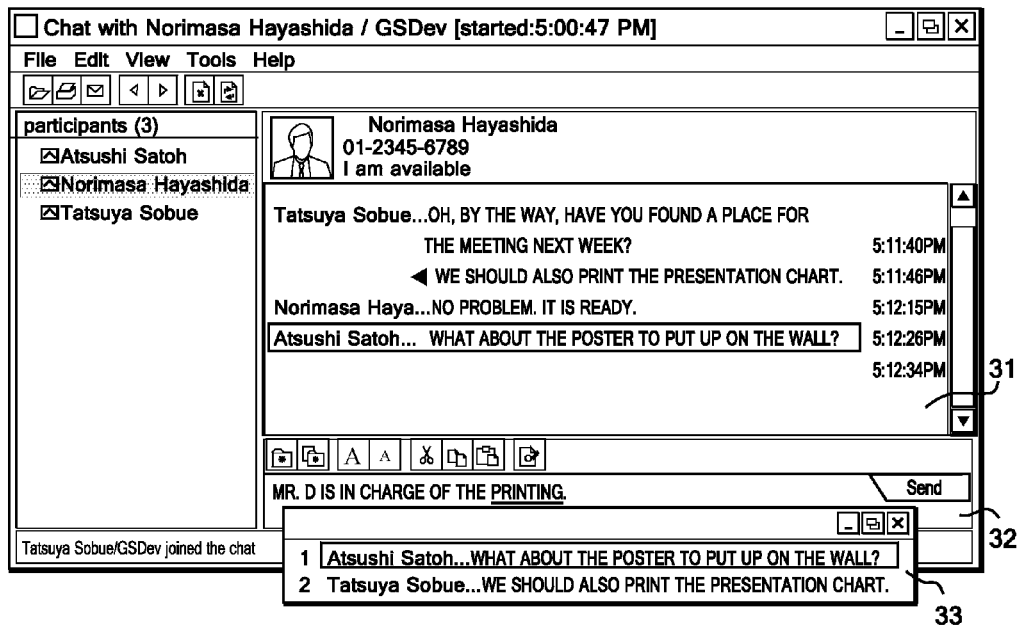
FIG. 2 is a view showing a first example of a screen that is shown when reference information is to be embedded, according to the embodiment of the present invention.

FIG. 2 is an example of a screen that is shown when reference information is to be embedded in an inputted utterance by this method.

In this example of the screen, an utterance "Mr. D is in charge of the printing" is inputted to an utterance input section 32. Since a word "printing" in the utterance is also included in past utterances shown in a past log display section 31, the word "printing" is marked with an underline in the utterance input section 32. If the participant clicks the word "printing" in this state, a referent candidate display window 33 is displayed, and the past utterances including the word "printing" are displayed in the window. Here, a preceding utterance including the word is displayed in the first line, and an utterance including the word and preceding the utterance displayed in the first line is displayed in the second line. Assume that the utterance in the first line is chosen from these utterances as indicated by a thick-line frame in FIG. 2. Then, reference information on the word "printing" in the utterance in the first line is embedded in the inputted utterance.

If the reference information is not embedded, it is unclear and hence ambiguous which one of "printing of a poster" and "printing of the presentation chart" the "printing" in the inputted utterance indicates. However, in this embodiment, it is made clear that the "printing" in the inputted utterance indicates "printing of a poster," by embedding the reference information.

Although the past utterances including exactly the same word as that included in the inputted utterance are used as referent candidates in this example, past utterances including words related to a word included in the inputted utterance may be used as referent candidates. Moreover, referent candidates may be determined on the basis of association between clauses in the inputted utterance and clauses in past utterances, association between the entire sentence of the inputted utterance and the entire sentence of each past utterance, and the like. In such a case, association detection based on higher-order language analysis of the inputted utterance and the past utterances may be employed.

(2) Indirect Input Using Utterance Number

This input method is preferable to be used when the entire utterance is desired to be referred to. A participant inputs a corresponding utterance number among those assigned in advance respectively to the utterances, in accordance with a predetermined rule, and the part specified by the utterance number is automatically converted into reference information.

This input method will be described below concretely.

Figure 3:
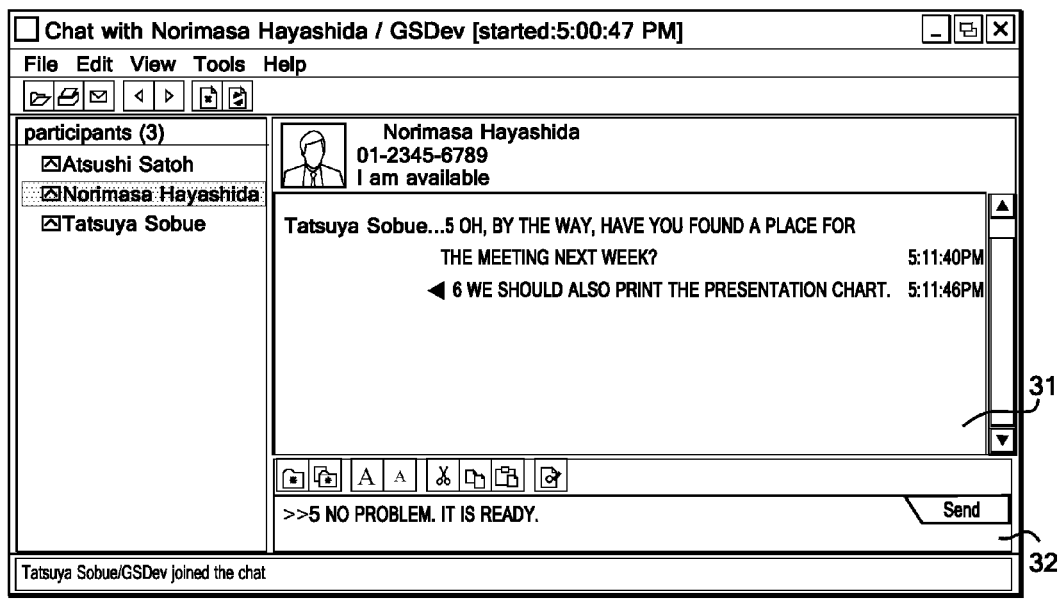
FIG. 3 is a view showing a second example of the screen that is shown when reference information is to be embedded, according to the embodiment of the present invention.

FIG. 3 is an example of a screen that is shown when reference information is to be embedded in an inputted utterance by this method.

In this example of the screen, an utterance number is assigned to each of past utterances displayed in the past log display section 31. Meanwhile, an utterance "No problem. It is ready." is inputted in the utterance input section 32, and an utterance number is specified by a description ">>5" added immediately before the utterance. Thereby, reference information on the utterance number "5" is embedded in the inputted utterance.

If the reference information is not embedded, it is unclear and hence ambiguous whether "it is ready" in the inputted utterance means the "meeting place" is ready or the "printing of the presentation chart" is ready. However, in this embodiment, it is made clear that "it is ready" means that the "meeting place" is ready, by embedding the reference information.

(3) Direct Input

If a referent cannot be chosen smoothly by any of the above-described indirect input methods, a participant chooses the entire corresponding utterance or the corresponding part of an utterance from the past log by using a mouse or the like, to copy the chosen part, and pastes the chosen part on the utterance that is now being inputted. Thereby, reference information on the chosen part is embedded in the utterance.

This input method will be described below concretely.

Figure 4:
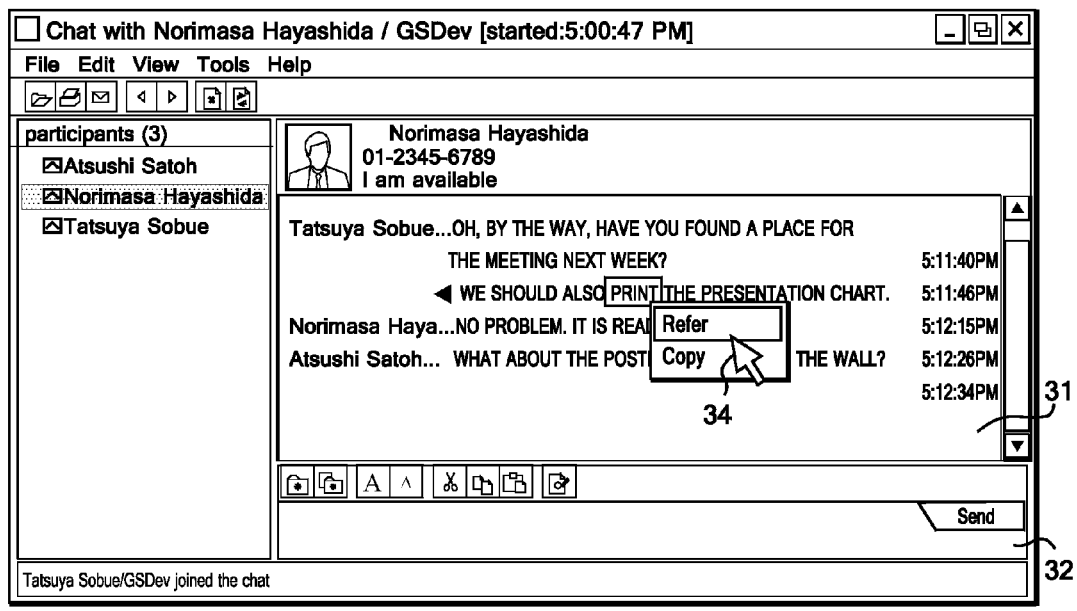
FIG. 4 is a view showing a third example of the screen that is shown when reference information is to be embedded, according to the embodiment of the present invention.

FIG. 4 is an example of a screen that is shown when reference information is to be embedded in an inputted utterance by this method.

In this example of the screen, among past utterances shown in the past log display section 31, a participant chooses "printing" in the utterance in the second line as a referent. The choosing of "printing" may be performed by positioning a mouse cursor at the "printing" and then dragging the cursor, for example. Thereafter, for example, the participant right-clicks the mouse to display a referent copy menu 34, and then determines the "printing" as a referent by choosing "refer." Assume that the participant subsequently displays the referent copy menu 34 in the utterance input section 32 and chooses "copy" this time. Then, reference information on the "printing" in the second line is embedded in the inputted utterance.

Utterance data on the utterance in which the reference information is embedded by any one of the above-described methods (1) to (3) is transmitted with the reference information to a participant who is the other party in the chat.

Then, the client 10 that has received the utterance data displays the contents of the utterance while displaying the reference information in an easy-to-understand format, and also registers the utterance data in the past log. Here, examples of a method of displaying the reference information are as follows.

(A) Display of Reference Information by Using Character Attribute

In this display method, a reference source part and a referent part are displayed by the same character attribute that is different from that of the other parts. Here, examples of the character attribute can be character color, background color or the like.

Figure 5:
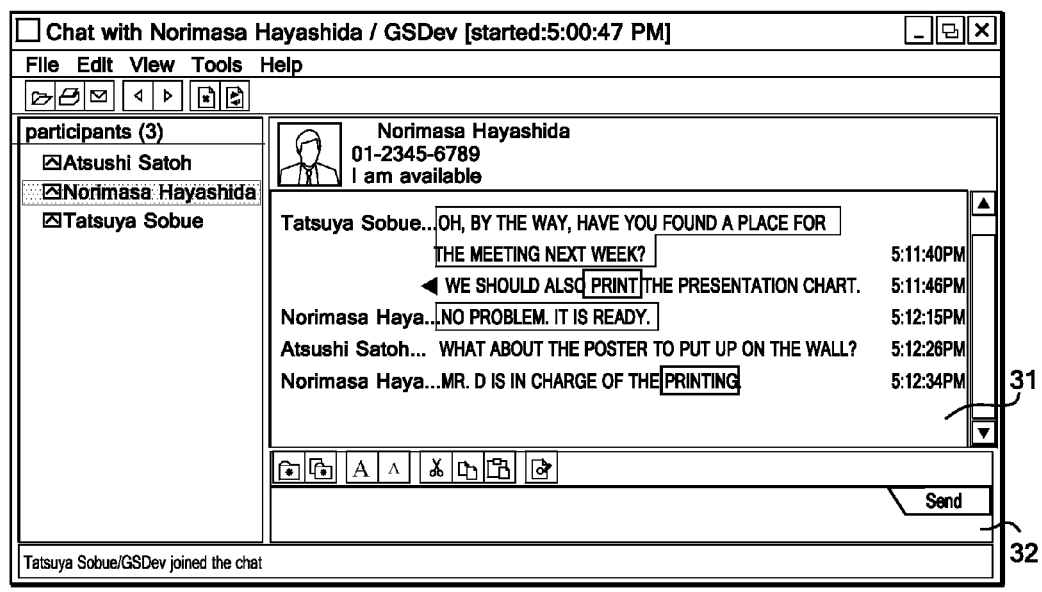
FIG. 5 is a view showing a first example of a screen that is shown when reference information is displayed, according to the embodiment of the present invention.

FIG. 5 is an example of a display screen used in this display method.

In FIG. 5, firstly, on the basis of the reference information embedded by the above-described method (1), thick-line frames show that the word "printing" in the utterance in the fifth line indicates the word "printing" in the utterance in the second line. Moreover, on the basis of the reference information embedded by the above-described method (2), thin-line frames show that the utterance in the third line is a reply to the utterance in the first line. In this example, utterance numbers are not assigned respectively to the past utterances. However, if utterance numbers are displayed, such a method that the utterance number of the utterance of the referent is displayed near the character string of the reference source may be employed, for example.

(B) Display of Reference Information by Using Special Object

This display method is to display information on the referent more directly. Specifically, firstly, a character string of the referent is marked and displayed to show that a choice can be made for the character string. Then, by clicking, by the mouse, the character string of the referent thus marked and displayed, a referent display object 35 is displayed, and the referent utterance is displayed in the object.

Figure 6:
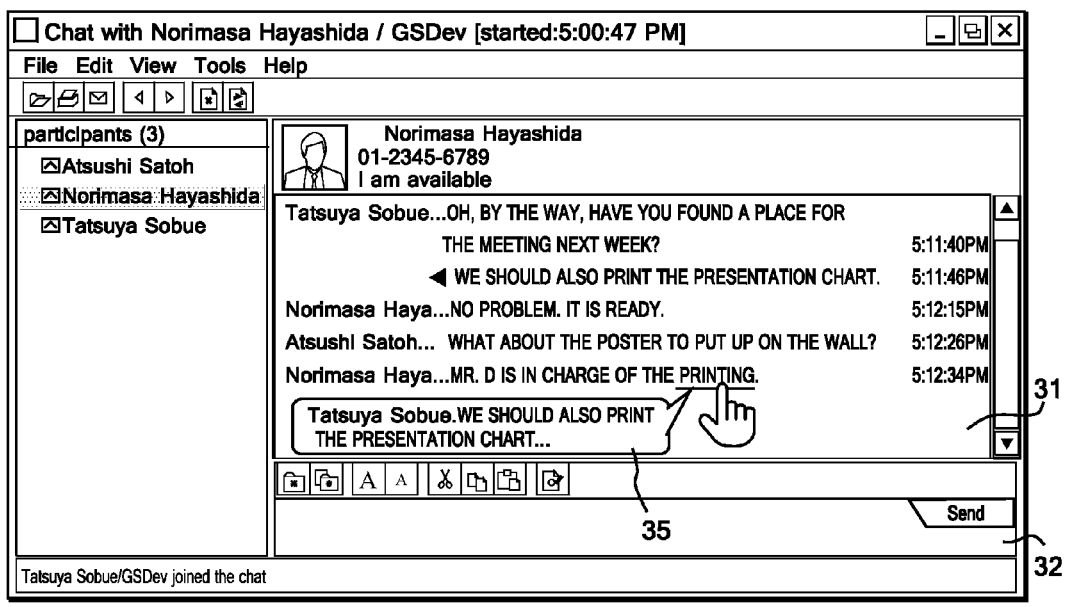
FIG. 6 is a view showing a second example of the screen that is shown when reference information is displayed, according to the embodiment of the present invention.

FIG. 6 shows an example of a display screen used in this display method.

In FIG. 6, on the basis of the reference information embedded by the above-described method (1), it is displayed in the referent display object 35 that the word "printing" in the utterance in the fifth line is related to the utterance in the second line. In this example, the information on the referent is displayed in the special object. However, such a method that the information is displayed in a pop-up window is also conceivable.

The methods of displaying reference information have been described above. Such reference information should also be stored in storing utterances in a log, so that the information can be used later at the time of perusing the past log.

Next, the client 10 performing the above-described operation will be described in detail.

Firstly, a functional configuration of the client 10 will be described.

Figure 7:
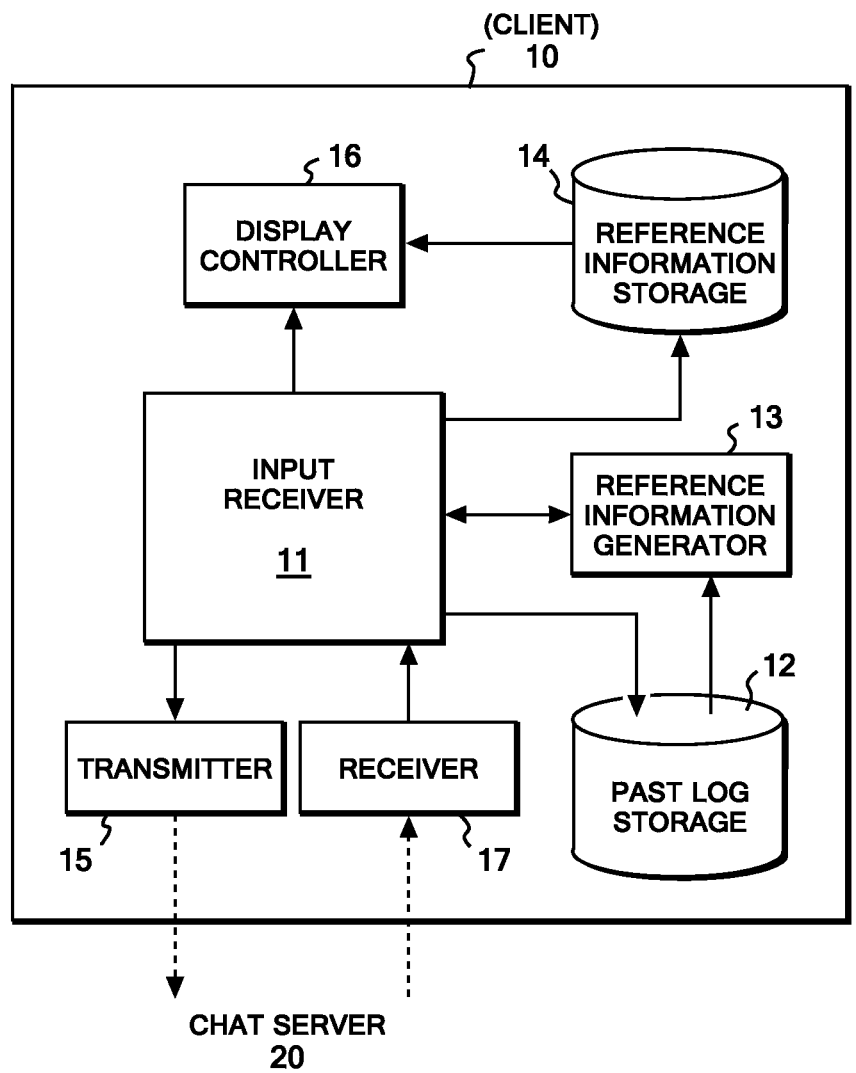
FIG. 7 is a diagram showing an example of a functional configuration of a client, according to the embodiment of the present invention.

FIG. 7 is a block diagram showing an example of the functional configuration of the client 10.

As shown in FIG. 7, the client 10 includes an input receiver 11, a past log storage 12, a reference information generator 13 and a reference information storage 14. In addition, the client 10 also includes a transmitter 15, a display controller 16 and a receiver 17.

The input receiver 11 receives various inputs such as an input of new utterance data to the utterance input section 32 (called "new utterance data," below), a choice input from the referent candidate display window 33, a choice input from the referent copy menu 34, a press input from a transmission button and an input from the receiver 17 to be described later. In this embodiment, the input receiver 11 is provided as an example of an acquiring unit that acquires messages.

The past log storage 12 stores therein a log of utterance data received by the input receiver 11 in the past (called a "past log," below). In this embodiment, the past log storage 12 is provided as an example of a storage unit that stores therein multiple messages and an example of a recording medium in which multiple messages are recorded.

The reference information generator 13 generates reference information indicating a past utterance data to which a new utterance data received by the input receiver 11 refers among utterance data made earlier than the new utterance data and stored in the past log storage 12 (called "preceding utterance data," below). In this embodiment, the new utterance data is used as an example of a first message that is newly acquired, and the preceding utterance data are used as an example of multiple messages stored in the storage. Moreover, the reference information generator 13 is provided as an example of a determining unit that determines a second message to which the first message refers and an example of a generating unit that generates reference information.

The reference information storage 14 stores therein the reference information generated by the reference information generator 13.

The transmitter 15 transmits, to the other client 10, the new utterance data received by the input receiver 11 and the reference information generated by the reference information generator 13, upon receipt, by the input receiver 11, of a press input from the transmission button.

The display controller 16 controls display of the new utterance data received by the input receiver 11. Moreover, the display controller 16 also displays an indicator that indicates a relationship between a reference source and a referent, on the basis of the reference information stored in the reference information storage 14. In this embodiment, the display controller 16 is provided as an example of a display unit that displays the first message, the multiple messages stored in the storage, and the indicator based on the reference information.

The receiver 17 receives the new utterance data inputted to the other client 10, from the client 10. In this embodiment, the receiver 17 is provided as an example of a receiving unit that receives messages.

The past log stored in the past log storage 12 will be described below.

FIGS. 8A and 8B are tables each showing an example of the past log stored in the past log storage 12.

As shown in FIGS. 8A and 8B, each utterance number is associated with utterance data in the past logs. Here, FIG. 8A is an example of a past log when the display in FIG. 2 is shown, while FIG. 8B is an example of a past log when the display in FIG. 3 is shown.

Next, operation of the client 10 will be described in detail.

Firstly, description will be given of a case in which the client 10 transmits an utterance data.

Figure 9:
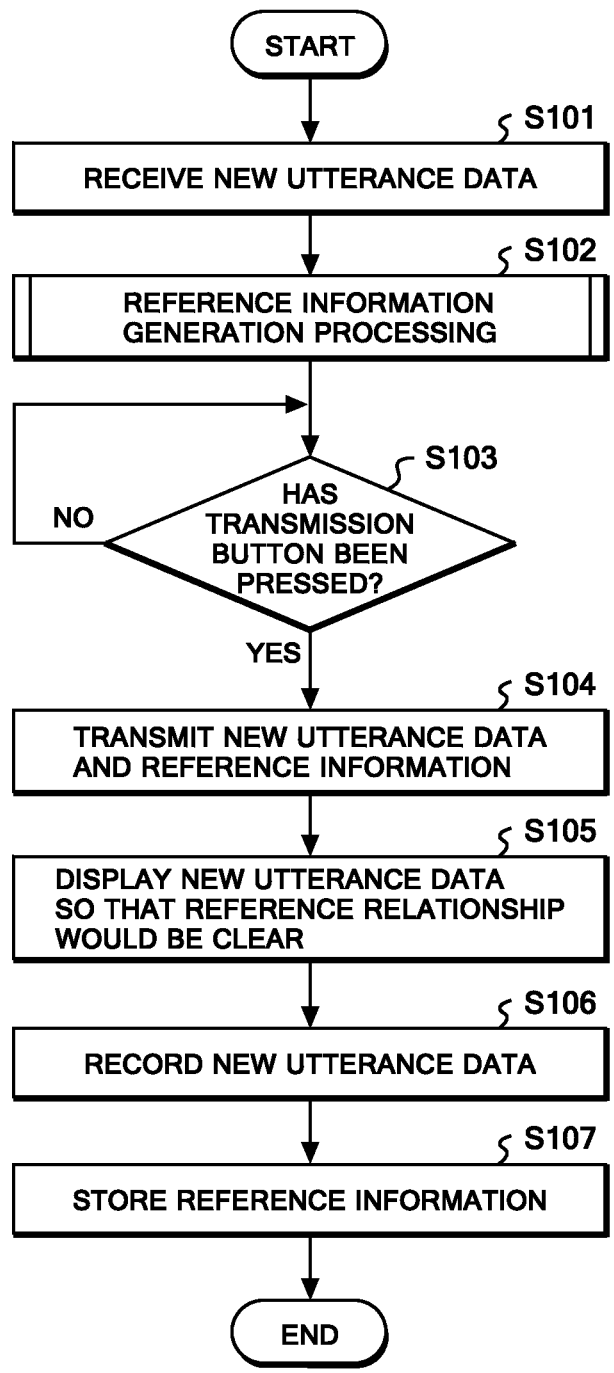
FIG. 9 is a flowchart showing an example of operation in the client in transmitting utterance data, according to the embodiment of the present invention.

FIG. 9 is a flowchart showing an example of main operation in this case.

First, when a participant inputs a new utterance data in the utterance input section 32, the input receiver 11 receives the new utterance data (Step 101). Then, by controlling the reference information generator 13, reference information generation processing to be described later is performed, and thereby reference information is obtained (Step 102).

Then, the input receiver 11 judges whether the transmission button has been pressed (Step 103). If the transmission button has not been pressed, the input receiver 11 waits until the transmission button is pressed. If the transmission button has been pressed, on the other hand, the input receiver 11 transfers the new utterance data and the reference information to the transmitter 15, and the transmitter 15 transmits the new utterance data and the reference information to the client 10 of the other party in the chat through the chat server 20 (Step 104). In this event, the input receiver 11 also transfers the new utterance data and the reference information to the display controller 16, and the display controller 16 displays the new utterance data so that a reference relationship based on the reference information would be clear (Step 105). Here, if reference information indicating a reference relationship between preceding utterance data currently displayed in the screen is included in those already stored in the reference information storage 14, the display controller 16 also displays the reference relationship. Moreover, the input receiver 11 registers the new utterance data in the past log storage 12 (Step 106), and stores the reference information in the reference information storage 14 (Step 107).

The reference information generation processing performed by the reference information generator 13 in Step 102 will be described below in detail.

A method of generating reference information in this step is different for each of the above-described input methods (1) to (3). Accordingly, the generation methods will be described below in turn as reference information processing 1, reference information processing 2 and reference information processing 3.

(1) Reference Information Generation Processing 1

Figure 10:
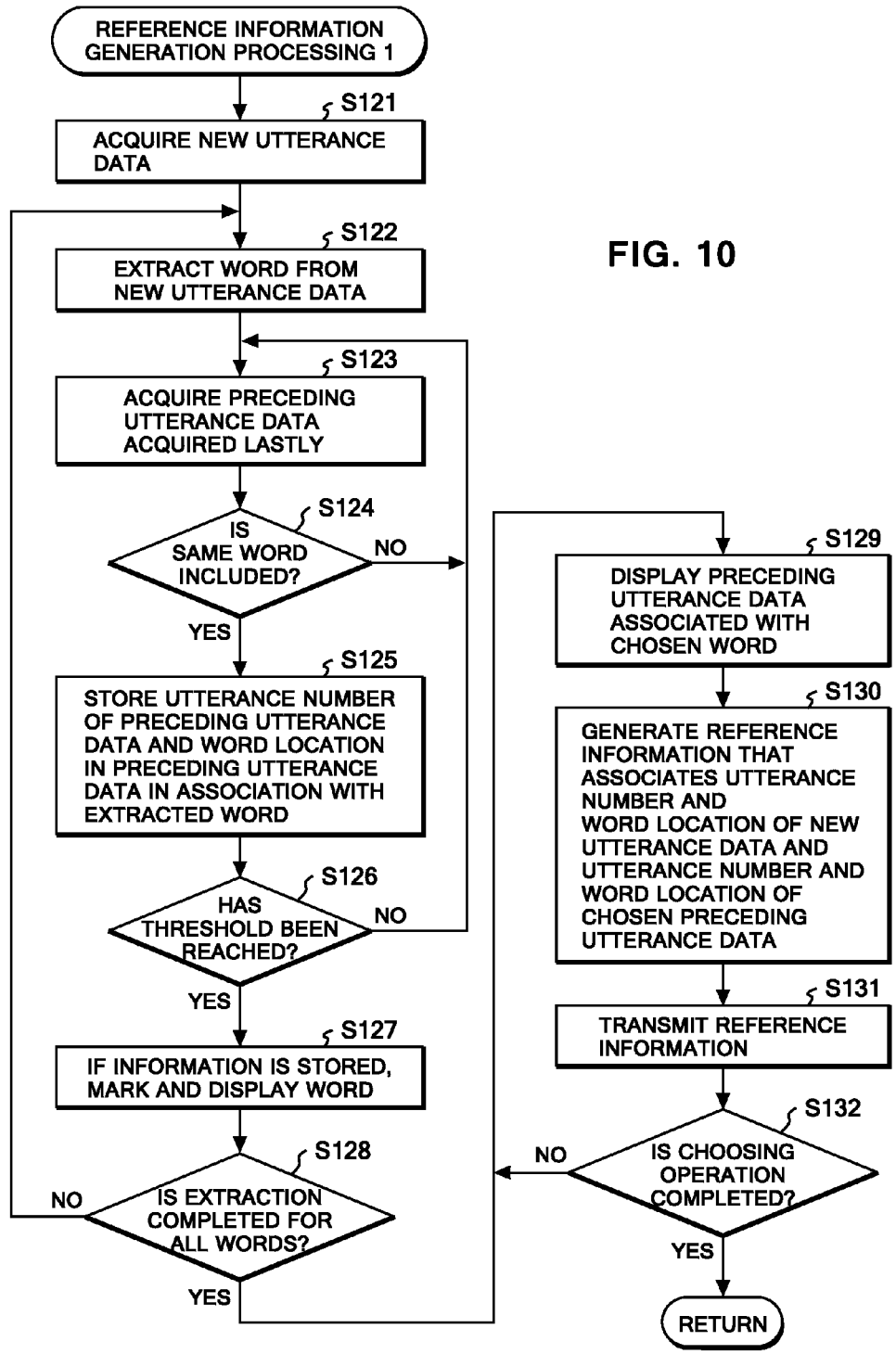
FIG. 10 is a flowchart showing a first example of operation in reference information generation processing in the client, according to the embodiment of the present invention.

FIG. 10 is a flowchart showing an example of operation in the reference information generation processing 1.

In this processing, firstly, the reference information generator 13 acquires the new utterance data received by the input receiver 11 (Step 121).

Then, the reference information generator 13 scans the new utterance data from the beginning, and extracts a word suitable for investigating a reference relationship (Step 122). Here, examples of the word suitable for investigating a reference relationship are words having meanings such as a noun and a verb. In other words, it is desirable that postpositional particles such as "wa" and "ga" (used as postpositional particles in Japanese) and auxiliary verbs "desu" and "masu" (used as auxiliary verbs in Japanese) be excluded in advance so as not to be extracted as such a word.

Meanwhile, the reference information generator 13 takes out the preceding utterance data that is the last preceding utterance data, from the past log storage 12 (Step 123). Then, the reference information generator 13 judges whether the extracted word exists in the preceding utterance data taken out in Step 123 (Step 124).

As a result, if the extracted word does not exist in the preceding utterance data, the reference information generator 13 returns to Step 123, takes out the preceding utterance data before the preceding utterance data taken out lastly, and then performs judgment in Step 124.

On the other hand, if the extracted word exists in the preceding utterance data, the reference information generator 13 associates the extracted words with the utterance number of the preceding utterance data and the location of the word in the preceding utterance data (word location), and stores the association (Step 125). For example, in the case where the past log shown in FIG. 8A is registered in the past log storage 12, an utterance number "6" and a word location "10-11" as well as an utterance number "8" and a word location "10-11" are stored with respect to a word location "1-2" of the new utterance data.

Then, the reference information generator 13 judges whether the number of preceding utterance data taken out in Step 123 has reached a threshold (Step 126). If the number of the preceding utterance data thus taken out has not reached the threshold, the reference information generator 13 returns to Step 123, extracts preceding utterance data before the preceding utterance data taken out lastly, and then performs the operations in Steps 124 and 125. If the number of the preceding utterance data thus taken out has reached the threshold, and information on the word extracted in Step 122 is stored in Step 125, the reference information generator 13 marks and displays the word in the utterance input section 32 to show that a choice can be made for this word (Step 127). Here, the threshold may be determined as a number of preceding utterance data to go back, or seconds or minutes to go back with respect to preceding utterance data. The reason why a limitation is set for preceding utterance data to go back is that it is unlikely to reply to extremely old utterance in a chat.

Thereafter, the reference information generator 13 judges whether extraction of all suitable words from the new utterance data acquired in Step 121 is completed, in other words, whether there is no more word to be extracted (Step 128).

As a result, if extraction of all suitable words is not completed, in other words, if there is still a word to be extracted, the reference information generator 13 performs the operations in Steps 122 to 127 for the word.

On the other hand, if extraction of all suitable words is completed, in other words, if there is no more word to be extracted, the reference information generator 13 advances to processing for receiving a choosing operation by the participant. Here, each word included in preceding utterance data within a certain range, among the words included in the new utterance data, is marked and displayed to show that a choice can be made for the word. For example, in FIG. 2, only the word "printing" is included in both the new utterance data and the preceding utterance data, and hence only this word is marked and displayed. However, if there is another word included in both the new utterance data and the preceding utterance data, the word is also marked and displayed.

When the input receiver 11 receives a choice with respect to any of the words thus marked and displayed, the reference information generator 13 instructs the display controller 16 to perform such a control that the referent candidate display window 33 including as a list the preceding utterance data identified by the utterance numbers stored in association with the word in Step 125 would be displayed on the screen of the client 10 (Step 129). For example, if the past log shown in FIG. 8A is registered in the past log storage 12, the referent candidate display window 33 including the preceding utterance data identified by the utterance number "6" and the preceding utterance data identified by the utterance number "8" is displayed since the utterance numbers "6" and "8" are stored with respect to the word location "1-2" of the new utterance data in Step 125.

Next, when the participant performs an operation to choose one of the preceding utterance data in the referent candidate display window 33, the input receiver 11 receives the choosing operation, and then notifies the reference information generator 13 of the choice. Upon receipt of the notification, the reference information generator 13 generates reference information that associates the utterance number of the new utterance data, the location of the word (word location) in the new utterance data chosen in Step 129, the utterance number of the preceding utterance data just chosen, and the location of the word (word location) in the preceding utterance data chosen in Step 129 (Step 130). For example, the preceding utterance data identified by the utterance number "8" is chosen in FIG. 2, and thus the reference information generator 13 generates reference information including the utterance number "8" and the word location "10-11" as information on the referent. Thereafter, the reference information generator 13 transmits this reference information to the input receiver 11 (Step 131).

Subsequently, the input receiver 11 judges whether the choosing operation performed on the utterance input section 32 is completed (Step 132). As a result, if the choosing operation is not completed, the reference information generator 13 performs the operations in Steps 129 to 131 in accordance with the next choosing operation. If the choosing operation is completed, the processing is terminated.

Here, although the preceding utterance data including exactly the same word as that included in the new utterance data are used as referent candidates in this operation example, preceding utterance data including a word related to the word included in the new utterance data may be used as referent candidates. Whether two words are related or not may be judged in accordance with a predetermined rule, or may be determined by using other existing techniques. Moreover, a relationship between clauses in a new utterance data and preceding utterance data or a relationship between the entire sentences of the new utterance data and the preceding utterance data may be taken into account instead of a relationship between words included in the new utterance data and the preceding utterance data. In other words, the reference relationship therebetween may be determined by analyzing at least any one of the new utterance data and the preceding utterance data to quantify the meaning of the utterance. In short, reference information may be generated in any way as long as being generated at least on the basis of an analysis result of the new utterance data.

(2) Reference Information Generation Processing 2

Figure 11:
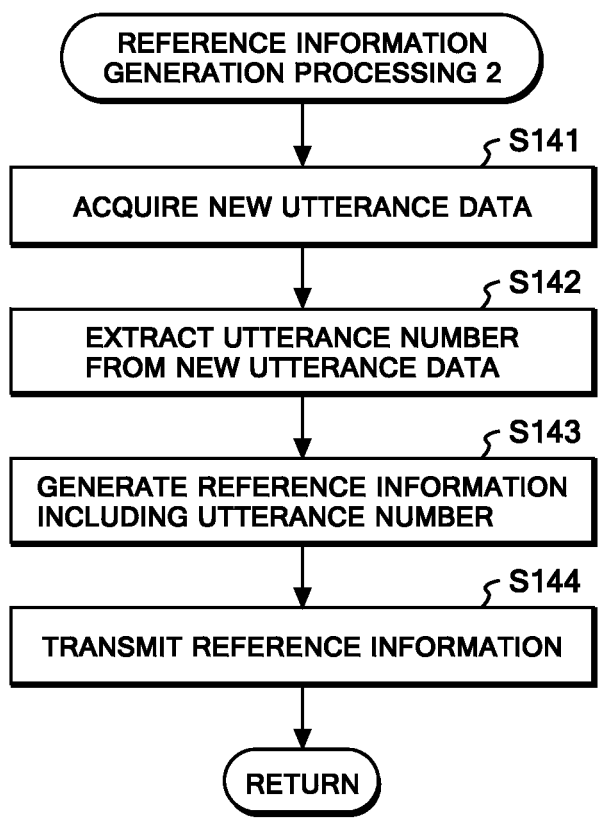
FIG. 11 is a flowchart showing a second example of the operation in reference information generation processing in the client, according to the embodiment of the present invention.

FIG. 11 is a flowchart showing an example of operation in the reference information generation processing 2.

In this processing, firstly, the reference information generator 13 acquires new utterance data received by the input receiver 11 (Step 141).

Then, the reference information generator 13 scans the new utterance data from the beginning, and extracts a number following a predetermined particular character string, as the utterance number of the preceding utterance data of the referent (Step 142). For example, the predetermine character string ">>" is found in FIG. 3, and thus the utterance number "5" following the character string is extracted.

Thereafter, the reference information generator 13 generates reference information associating the utterance number of the new utterance data and the utterance number of the preceding utterance data extracted in Step 142 (Step 143). For example, the preceding utterance data identified by the utterance number "5" is specified in FIG. 3, and thus reference information including the utterance number "5" as referent information is generated. Then, the reference information generator 13 transmits the reference information to the input receiver 11 (Step 144).

Although a number following the particular character string in new utterance data is extracted as a number assigned to preceding utterance data of the referent in this operation example, preceding utterance data of the referent is not limited thereto. Specifically, preceding utterance data of the referent may be specified in any way as long as being specified on the basis of identification information obtained by a result of an analysis performed on a new utterance data.

(3) Reference Information Generation Processing 3

Figure 12:
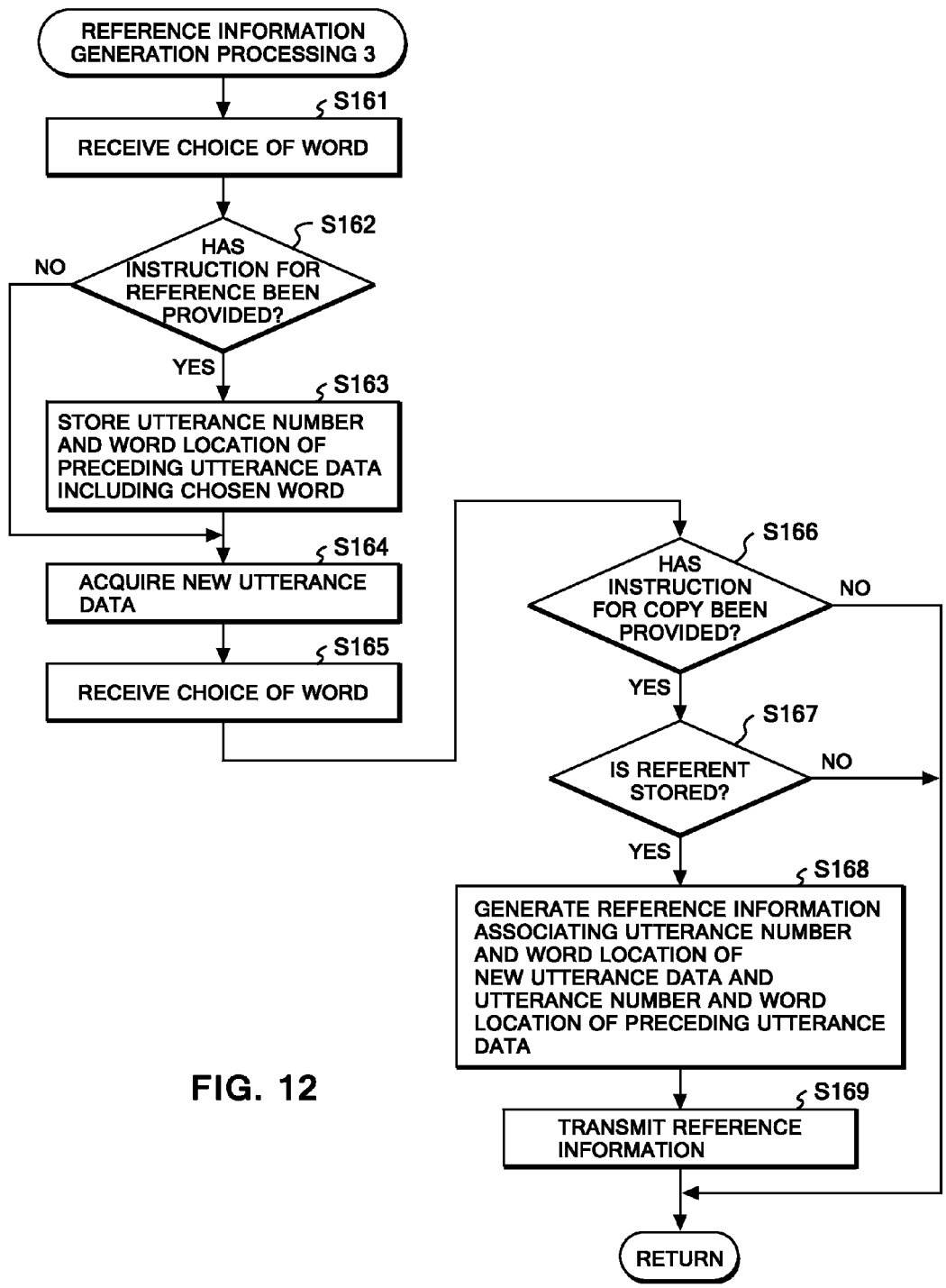
FIG. 12 is a flowchart showing a third example of the operation in reference information generation processing in the client, according to the embodiment of the present invention.

FIG. 12 is a flowchart showing an example of operation in the reference information generation processing 3.

In this processing, firstly, the reference information generator 13 receives a choice of a word in preceding utterance data through the input receiver 11 (Step 161). Then, the reference information generator 13 judges whether an instruction for reference has been provided through the referent copy menu 34 (Step 162).

As a result, if an instruction for reference has been provided, the reference information generator 13 stores the utterance number of the preceding utterance data including the word chosen in Step 161 and the location of the word (word location) chosen in Step 161 in the preceding utterance data (Step 163). On the other hand, if an instruction for reference has not been provided, the reference information generator 13 does not store such information on a referent.

Then, the reference information generator 13 acquires new utterance data received by the input receiver 11 (Step 164), and receives a choice of a word in the new utterance data through the input receiver 11 (Step 165). Thereafter, the reference information generator 13 judges whether an instruction for copy has been provided through the referent copy menu 34 (Step 166).

As a result, if an instruction for copy is provided, the reference information generator 13 judges whether the information on the referent is stored in Step 163 (Step 167). Then, if the information on the referent is stored, the reference information generator 13 generates reference information associating the utterance number of the new utterance data, the location of the word (word location) chosen in Step 165 in the new utterance data, the utterance number of the preceding utterance data stored in Step 163, and the word location in the preceding utterance data stored in Step 163 (Step 168). Thereafter, the reference information generator 13 transmits this reference information to the input receiver 11 (Step 169).

In the following, the reference information generated by any of the above-described reference information processing will be described.

Figures 13, 14:
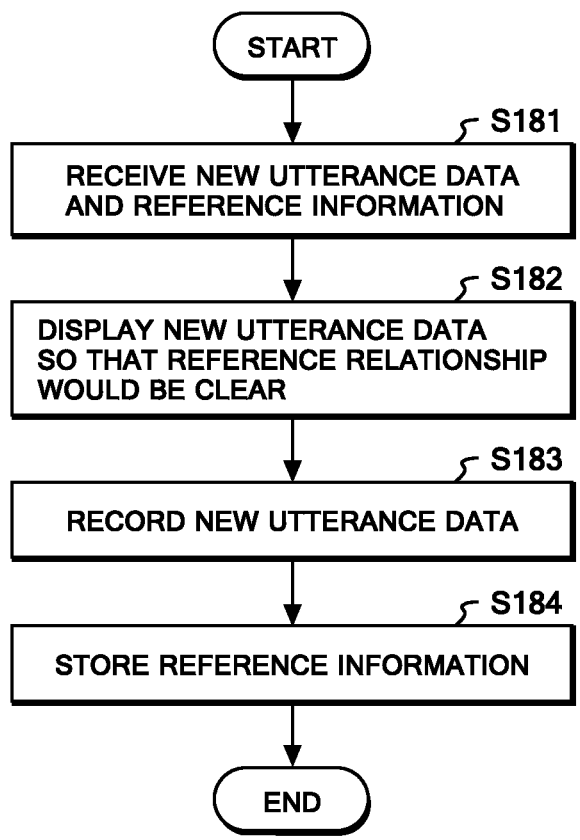
FIG. 13 is a table showing an example of reference information generated by the client, according to the embodiment of the present invention.
FIG. 14 is a flowchart showing an example of operation in the client in receiving utterance data, according to the embodiment of the present invention.

FIG. 13 is a table showing an example of the reference information generated by the reference information generation processing.

As shown in FIG. 13, the reference information associates reference source information on a reference source and referent information on the corresponding referent. The reference source information further includes the utterance number of the utterance data of the reference source and a word location in the utterance data. The referent information further includes the utterance number of the utterance data of the referent and the word location in the utterance data.

In FIG. 13, the first line shows the reference information generated in the example shown in FIG. 3, and the second line shows the reference information generated in the example shown in FIG. 2.

Next, description will be given of a case in which the client 10 receives utterance data.

FIG. 14 is a flowchart showing an example of main operation of the client 10 in this case.

Firstly, when new utterance data and reference information are transmitted from the other client 10, the receiver 17 receives the new utterance data and the reference information, and transfers the new utterance data and the reference information to the input receiver 11 (Step 181).

Thereby, the input receiver 11 transfers the new utterance data and the reference information to the display controller 16, and the display controller 16 displays the new utterance data in such a way that the reference relationship based on the reference information would be clear (Step 182). Here, if reference information indicating a reference relationship between preceding utterance data currently displayed in the screen is included in those already stored in the reference information storage 14, the display controller 16 also displays the reference relationship. Moreover, the input receiver 11 registers the new utterance data in the past log storage 12 (Step 183), and stores the reference information in the reference information storage 14 (Step 184).

Then, the operation in this embodiment is terminated.

As described above, in this embodiment, information showing that a past utterance is referred to is embedded in an utterance in a chat. To make it possible to embed reference of the past utterance easily, a reference input support function is provided, for example. Moreover, by transmitting the embedded information together with the contents of the utterance to the other party in the chat, the contents of the utterance are displayed so that the reference relationship would be clear. Thus, reference information is used in this embodiment to solve the problem that the context of a conversation becomes difficult to understand when utterances are mixed up.

Furthermore, in this embodiment, by embedding reference information in an utterance data in a chat, the reference relationships between utterances is made clear when the log of the chat is displayed. Alternatively, the present invention may be applied to a bulletin board system in which multiple users write various utterances, so that the reference relationships between utterances would be clear when the log of the utterances written in the bulletin board is displayed.

Figure 15:
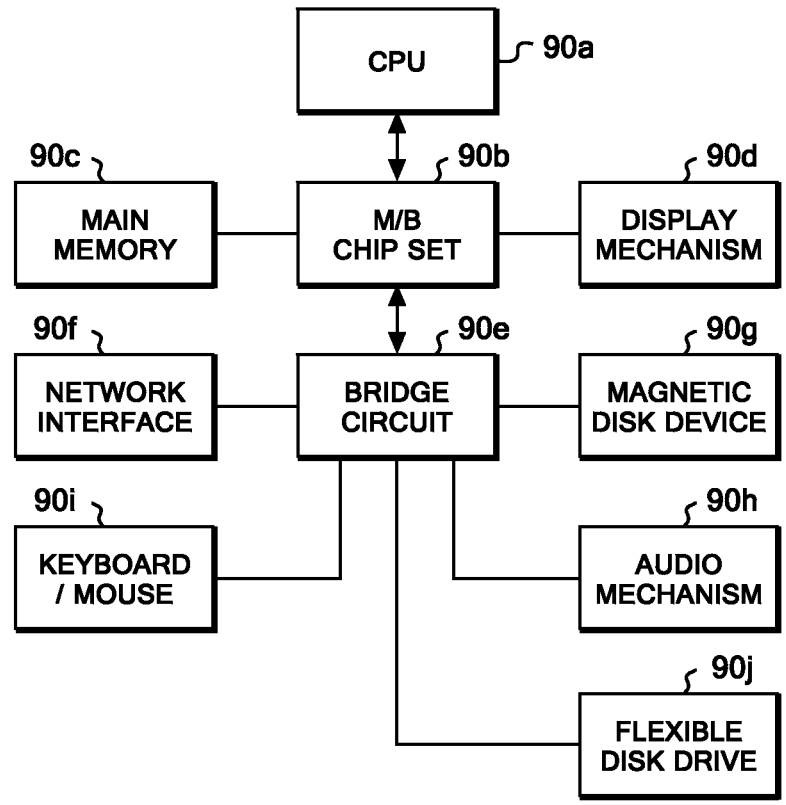
FIG. 15 is a diagram showing a hardware configuration of a computer to which the embodiment of the present invention is applicable.

Lastly, a preferable hardware configuration of a computer to which this embodiment is applied will be described. FIG. 15 is a diagram showing an example of a hardware configuration of such a computer. As shown in FIG. 15, the computer includes: a CPU (central processing unit) 90a serving as a calculation means; a main memory 90c connected to the CPU 90a via an M/B (mother board) chip set 90b; and a display mechanism 90d similarly connected to the CPU 90a via the M/B chip set 90b. Moreover, to the M/B chip set 90b, a network interface 90f, a magnetic disk drive (HDD) 90g, an audio mechanism 90h, a keyboard/mouse 90i and a flexible disk drive 90j are connected via a bridge circuit 90e.

In FIG. 15, the components are connected to each other through buses. For example, the CPU 90a and the M/B chip set 90b are connected by a CPU bus, and the M/B chip set 90b and the main memory 90c are connected by a CPU bus. Moreover, the M/B chip set 90b and the display mechanism 90d may be connected via an accelerated graphics port (AGP). However, if the display mechanism 90d includes a video card conforming to PCI Express, the M/B chip set 90b and the video card are connected by a PCI Express (PCIe) bus. For the connection between the bridge circuit 90e and the network interface 90f, PCI Express can be used, for example. For the connection between the bridge circuit 90e and the magnetic disk device 90g, a serial ATA (AT attachment), a parallel transfer ATA or a peripheral components interconnect (PCI) can be used, for example. Furthermore, for the connection of each of the keyboard/mouse 90i and the flexible disk drive 90j with the bridge circuit 90e, a universal serial bus (USB) can be used, for example.

Here, the present invention may be totally implemented by hardware or software. Moreover, the present invention can be alternatively implemented by both hardware and software. Furthermore, the present invention can be implemented as a computer, a data processing system or a computer program. This computer program can be provided by being stored in a computer-readable medium. Here, conceivable as the medium are electronic, magnetic, optical, electromagnetic, infrared, and semiconductor systems (device or equipment) and a propagation medium. Moreover, examples of the computer-readable medium are a semiconductor and solid-state storage device, a magnetic tape, a removable computer diskette, a random access memory (RAM), a read only memory (ROM), a rigid magnetic disc and an optical disc. Current examples of the optical disk include a compact disc read-only memory (CD-ROM), a compact disc-rewritable (CD-R/W) and a DVD.

According to the present invention, when a user makes a new utterance, a correct reference relationship between the new utterance and a particular utterance made in the past can be displayed without requiring time and work more than necessary.

The present invention has been described by using the above-described embodiment. However, the technical scope of the present invention is not limited to the embodiment. It is apparent to those skilled in the art that various changes can be made in the embodiment and alternative embodiments can be employed without departing from the spirit and scope of the present invention.

What is claimed is:

1. An apparatus including one or more processors and one or more memories that manages a group of a plurality of messages inputted by a plurality of users, the apparatus comprising:
   one or more computing devices including an acquiring unit that acquires a message;
   a storage unit included in the one or more computing devices that stores a plurality of messages acquired in the past by the acquiring unit; and
   a generating unit included in the one or more computing devices that generates reference information based on a result of analysis on a first message in an instant messaging chat session that is newly acquired by the acquiring unit, the reference information indicating a reference relationship between the first message and a second message that is one of the plurality of messages stored in the storage unit and is referred to by the first message, wherein the generating unit determines, as the second message, a message including a word related to a word included in the first message, among the plurality of messages stored in the storage unit, wherein the generating unit determines the second message by searching, on the basis of the result of the analysis on the first message, the plurality of messages stored in the storage unit, and wherein the generating unit displays at least one message obtained by searching the plurality of messages stored in the storage unit on the basis of the result of the analysis on the first message, and then determines, as the second message, one message chosen by a user from among the at least one message;
   wherein the generating unit generates the reference information including identification information on the second message obtained on the basis of the result of the analysis on the first message and embeds the reference information within the second message in the instant messaging chat session;
   wherein the reference information is generated and the plurality of messages are displayed when the second message is received in a text field of the instant messaging chat session window and prior to submitting the second message to an instant messaging chat session;
   wherein the reference information embedded within the second message is displayed in a separate pop-up window in response to a hover action over the reference embedded within the second message in the instant messaging chat session after the second message is submitted to the instant messaging chat session.

2. The apparatus of claim 1 wherein the analysis on the first message includes one or more of a syntactic analysis of content associated with the first message and a semantic analysis of content associated with the first message.

3. An apparatus including one or more processors and one or more memories, the apparatus comprising:
   one or more computing devices including an acquiring unit that acquires a message inputted through the apparatus;
   a receiving unit included in the one or more computing devices that receives, from a different apparatus, another message inputted through the different apparatus;

a storage unit included in the one or more computing devices that stores a plurality of messages including a message acquired in the past by the acquiring unit and the another message received in the past by the receiving unit;

a determining unit included in the one or more computing devices that displays at least one message including a word related to a word included in a first message in an instant messaging chat session newly acquired by the acquiring unit, among the plurality of messages stored in the storage unit, and then determines, among the plurality of messages, a second message referred to by the first message, by causing a user to choose one message from among the at least one message;

a generating unit included in the one or more computing devices that generates reference information indicating a reference relationship between the first message acquired by the acquiring unit and the second message determined by the determining unit; and a display unit that displays the first message acquired by the acquiring unit, the plurality of messages stored in the storage unit, and an indicator based on the reference information generated by the generating unit;

wherein the generating unit generates the reference information including identification information on the second message obtained on the basis of the result of an analysis on the first message and embeds the reference information within the second message in the instant messaging chat session;

wherein the reference information is generated and the plurality of messages are displayed when the second message is received in a text field of the instant messaging chat session window and prior to submitting the second message to an instant messaging chat session;

wherein the reference information embedded within the second message is displayed in a separate pop-up window in response to a hover action over the reference embedded within the second message in the instant messaging chat session after the second message is submitted to the instant messaging chat session.

4. The apparatus of claim 3 wherein the analysis on the first message includes one or more of a syntactic analysis of content associated with the first message and a semantic analysis of content associated with the first message.

5. A method of managing a group of a plurality messages inputted by a plurality of users, the method comprising:

recording, via one or more hardware processors, a plurality of messages inputted in the past, in a recording medium;

acquiring, via the one or more hardware processors, a first message in an instant messaging chat session that is newly inputted; and generating, via the one or more hardware processors, reference information based on a result of analysis on the first message, the reference information indicating a reference relationship between the first message and a second message that is one of the plurality of messages recorded in the recording medium and is referred to by the first message, wherein the generating unit determines, as the second message, a message including a word related to a word included in the first message, among the plurality of messages stored in the storage unit, wherein the second message is determined, at least in part, by searching, on the basis of the result of the analysis on the first message, the plurality of messages recorded in the recording medium, wherein at least one message obtained by searching the plurality of messages recorded in the recording medium on the basis of the result of the analysis on the first message is displayed, and wherein the second message is determined, at least in part, by the user choosing one message from among the at least one message;

wherein the generating unit generates the reference information including identification information on the second message obtained on the basis of the result of the analysis on the first message and embeds the reference information within second message in the instant messaging chat session;

wherein the reference information is generated and the plurality of messages are displayed when the second message is received in a text field of the instant messaging chat session window and prior to submitting the second message to the instant messaging chat session;

wherein the reference information embedded within the second message is displayed in a separate pop-up window in response to a hover action over the reference embedded within the second message in the instant messaging chat session after the second message is submitted to the instant messaging chat session.

6. The method of claim 5, wherein the at least one message obtained by searching the plurality of messages and the at least one message displayed is selectable.

7. The method of claim 5, wherein the first message was newly inputted into a chat graphical user interface by the user for input into the chat, wherein the plurality of messages inputted in the past are messages previously inputted into the chat by one or more users involved in the chat, wherein the at least one message obtained is one of the plurality of messages inputted into the chat by the one or more users involved in the chat, and wherein the second message is chosen from the at least one message obtained.

8. The method of claim 5, wherein the at least one message displayed is displayed from, at least in part, a chat graphical user interface and wherein the at least one message is selectable.

9. The method of claim 5 wherein the analysis on the first message includes one or more of a syntactic analysis of content associated with the first message and a semantic analysis of content associated with the first message.

10. A computer program product comprising a non-transitory computer-readable medium stores program code, the program code executed by a computer to function as:

an acquiring unit that acquires a message inputted through the apparatus;

a receiving unit that receives, from the different apparatus, a message inputted through the different apparatus;

a recording unit that records, in a recording medium, a plurality of messages including the message acquired in the past by the acquiring unit and another message received in the past by the receiving unit; and a generating unit that generates reference information based on a result of analysis on a first message in an instant messaging chat session newly acquired by the acquiring unit, the reference information indicating a reference relationship between the first message and a second message that is one of the plurality of messages recorded in the recording medium and is referred to by the first message, wherein the generating unit determines, as the second message, a message including a word related to a word included in the first message, among the plurality of messages stored in the storage unit, wherein the generating unit determines the second message by searching, on the basis of the result of the analysis on the first message, the plurality of messages recorded in the recording medium, wherein the generating unit displays at least one message obtained by searching the plurality of messages recorded in the recording medium on the basis of the result of the analysis on the first message, and then determines, as the second message, one message chosen by a user from among the at least one message;

wherein the generating unit generates the reference information including identification information on the second message obtained on the basis of the result of the analysis on the first message and embeds the reference information within the second message in the instant messaging chat session;

wherein the reference information is generated and the plurality of messages are displayed when the second message is received in a text field of the instant messaging chat session window and prior to submitting the second message to the instant messaging chat session;

wherein the reference information embedded within the second message is displayed in a separate pop-up window in response to a hover action over the reference embedded within the second message in the instant messaging chat session after the second message is submitted to the instant messaging chat session.

11. The computer program product of claim 10 wherein the analysis on the first message includes one or more of a syntactic analysis of content associated with the first message and a semantic analysis of content associated with the first message.

* * * * *